Martino Vecchio
Vittorio Fattore
Italo Cammarata
INVENTORS

United States Patent Office

3,372,126
Patented Mar. 5, 1968

3,372,126
PROCESS FOR PREPARING SPHEROIDAL FLUORINATING AGENTS CONTAINING CALCIUM FLUORIDE AND SUITABLE FOR FLUID-BEDS AND PRODUCT RESULTING THEREFROM
Martino Vecchio and Vittorio Fattore, Milan, and Italo Cammarata, Bollate, Milan, Italy, assignors to Montecatini Edison S.p.A., Milan, Italy, a corporation of Italy
Filed May 24, 1965, Ser. No. 458,048
Claims priority, application Italy, May 26, 1964, 11,702/64
16 Claims. (Cl. 252—182)

ABSTRACT OF THE DISCLOSURE

Process for the preparation of a spheroidal fluorinating agent containing calcium fluoride and calcium chloride, particularly suited for fluorination reactions conducted in fluid bed, comprising suspending calcium fluoride in an aqueous solution of calcium chloride and thence subjecting the resultant suspension to simultaneous granulation and drying. Also, the spheroidal fluorinating agent resulting therefrom.

---

Figure 1:
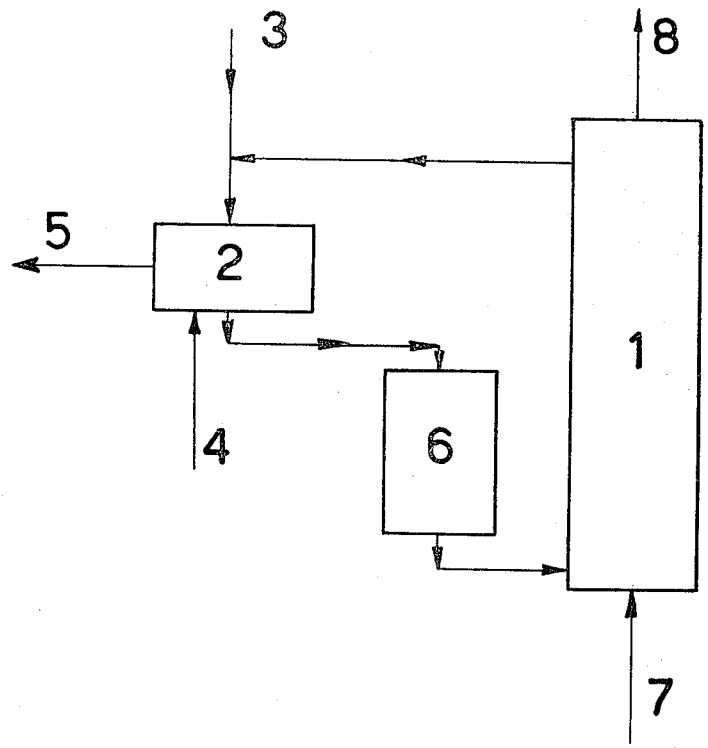
Figure 2:
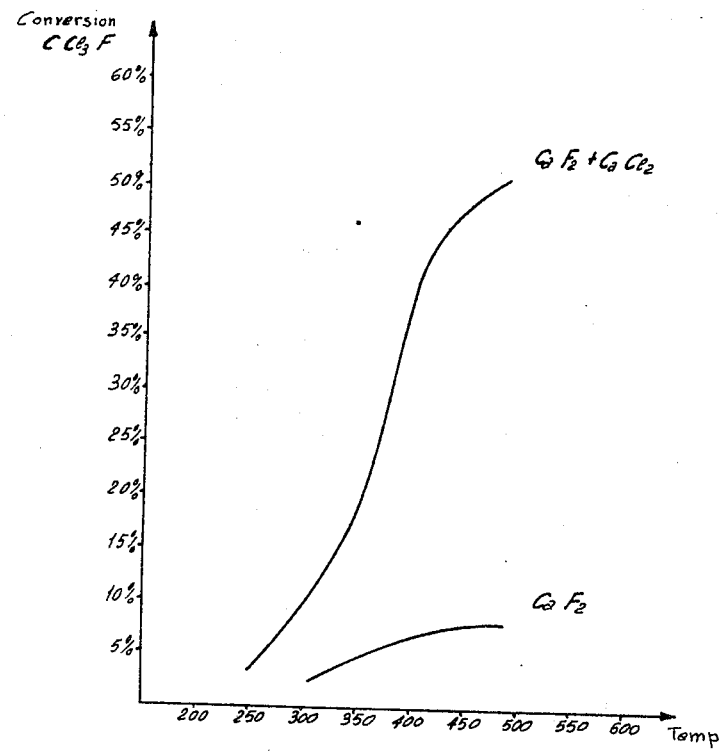

The present invention relates to a process for preparing spheroidal fluorinating agents containing calcium fluoride; more particularly, it relates to a process for preparing spheroidal fluorinating agents containing calcium fluoride and suitable to be employed as a reactant in fluid beds.

Some processes are known wherein calcium fluoride in the solid state is allowed to react with gaseous or vaporized compounds.

In point of fact, processes that use fluorinating agents containing calcium fluoride either alone or in combination with variable quantities of binders are known for carryng out reactions between compounds in a gaseous state with the fluorinating agents being supported on a fixed bed, however such processes afford poor conversion rates of the reactants.

One of the preferred techniques for contacting calcium fluoride with gaseous or vaporized reactants employs a fluid bed, according to which a bed of calcium fluoride particles of suitable diameter and shape, supported by a diaphragm and permeable to gases, is traversed by the gaseous compounds at such a rate as to effect the fluidization.

An example of the aforesaid technique is a process for preparing chlorofluorinated compounds by reacting carbon tetrachloride with calcium fluoride. In this instance, during the reaction, calcium chloride is formed as a byproduct on the surface of the grains which, on the one hand, covers the grains preventing the continuation of the reaction and, on the other hand, causes packing of the whole granular mass of calcium fluoride resulting in the stopping of the fluidization.

In order to obviate this drawback, some improvements have been suggested which consist in mixing the calcium fluoride particles with inert materials such as coal, silica and alumina. For example, satisfactory results were attained by mixing calcium fluoride with coal dust in amounts varying between 2 and 20% by weight, or with an inert material made up of the same inactive calcium fluoride and/or aluminum oxide and/or silica in proportions varying from 30 to 80%.

Application of such a technique requires the proportions of the different components of the mixture to be between rather narrow limits, which involves a very accurate selection of the material to be employed in the reaction.

When the material is exhausted and the amount of calcium chloride formed is so high to prevent the reaction from continuing, then it becomes necessary to reactivate the calcium fluoride. Said reactivation comprises: washing the mass with warm water until removal of the calcium chloride is complete; treating the suspension with a flocculating agent; subsequent filtration and final drying. To the obtained mass containing the washed calcium fluoride and all of the inert substances, fresh calcium fluoride is added and the mass is then re-admitted to the reaction zone.

The entire operation is quite complex, very burdensome and continuous performance of the process is very difficult.

Another disadvantage manifests itself in the poor reactivity of calcium fluoride for fluid beds prepared according to known processes.

For example, when carbon tetrachloride is reacted with calcium fluoride in a fluid bed $CFCl_3$ is the predominant product formed whereas very moderate amounts of further compounds with a higher fluorine content such as $CF_2Cl_2$ are obtained.

In this case the quantity of $CF_2Cl_2$ may be increased by operating at temperatures above 500° C. and by exploiting the phenomenon of thermal disproportionation which takes place at such a temperature, and which promotes the displacement of the reaction balance towards the formation of fluorinated hydrocarbons having a greater fluorine content. Under these conditions, however, a considerable loss of organic compounds takes place because of thermal cracking.

An object of the present invention is to provide an improved process for preparing a fluorinating agent containing $CaF_2$ and suited for use according to the fluid bed technique.

Another object is that of making available a kind of fluorinating agent containing $CaF_2$ suitable for fluid bed reactions and displaying a high degree of fluidization and a high packing resistance upon passage of time.

A further object is to provide a kind of fluorinating agent containing $CaF_2$ that is suitable for fluid bed reactions, displays a high fluorinating activity and that, when used for carbon tetrachloride fluorination, will allow compounds of high fluorine content to be obtained even when operating at relatively low temperatures.

Another object is to provide a fluorinating agent containing $CaF_2$ for fluid bed operation that need not necessarily be mixed with extraneous fluidizing agents such as, for example, coal, silica or alumina.

Another object is to provide a simple and economical process for reactivating the partially exhausted calcium fluoride to obtain a fluorinating agent containing $CaF_2$ suited for reactions in fluid bed.

Another object is that of making available a spheroidal fluorinating agent containing $CaF_2$ endowed with improved mechanical and chemical characteristics, suited for fluorination of organic compounds.

Still another object is that of preparing said spheroidal fluorinating agent containing calcium fluoride from calcium fluoride either prepared synthetically or from $CaF_2$ containing impurities such as, for example, the ore fluorite (fluorspar).

According ot the present invention a spheroidal fluorinating agent containing $CaF_2$ and particularly suited for fluid bed reactions is obtained by suspending calcium fluoride or a mineral containing it, such as, for example, fluorite, in an aqueous solution of calcium chloride obtained either by dissolution of calcium chloride in water or by the in situ reaction of hydrochloric acid with calcium compounds.

It is particularly advantageous to exploit for this purpose the calcium compounds in the fluorite as impurities, The suspension thus obtained is then subjected to a combined operation of granulation and simultaneous drying by means of a spray-drying device, by operating at a temperature of from between 100° C. and 500° C., preferably at a temperature of from between 200° and 350° C.

It has been found that under such conditions calcium chloride behaves not only as a binder for the calcium fluoride particles whereby the granular mass which is obtained after drying is particularly suited for employment in fluid beds, but also as a promoter of the fluorination reaction, and, as a matter of fact, the calcium chloride promotes the disproportionation reaction of the chlorofluorocarbons.

It has also been found that during utilization of the granules of the fluorinating agent according to the present invention, for example fluorination reaction in fluid bed, no problem is caused by the presence of calcium chloride in the same grains.

The proportion of calcium chloride employed as the binder for the particles of the fluorinating agent according to the present invention is comprised of between 1 and 20% by weight of the calcium fluoride.

As is known, the main advantage of spray-drying devices is that they effect particles having a substantially spheroidal shape, preferably hollow inside and, of varying size and granulometric distribution depending on the working conditions of the device.

Atomization may be accomplished by any one of several conventional atomizing devices such as high-pressure nozzles, two-fluid nozzles and high-speed rotating discs. Calcium fluoride concentration in the suspension widely depends on the working conditions of the type of spray-dryer. According to the present invention the preferred concentration of calcium fluoride in the suspension is from between 30 and 80% by weight.

When operating within the above indicated ratios, particles can be obtained having a granulometry of between 35 and 400 mesh. (Tyler standard scale) and displaying a substantially spheroidal shape, preferably hollow inside, and with a size distribution particularly suited for carrying out reactions in fluid bed.

The process according to the present invention may be applied either to pure calcium fluoride or to calcium fluoride containing impurities such as fluorite. The solution of calcium chloride wherein the suspension of calcium fluoride is carried out may be formed either by dissolving calcium chloride in water or by adding hydrochloric acid to an aqueous slurry of a calcium compound such as the oxide, hydrate or carbonate; in such a case, if when $CaF_2$ mineral fluorite is used, calcium chloride may be obtained by exploiting the impurities consisting of the calcium compounds different from $CaF_2$ that are contained in the mineral.

The advantages deriving from the object of the present invention are particularly apparent when the process is carried out on an industrial scale.

It is apparent that in such a case it may sometimes be useful to make recourse to a reactivation of the partially exhausted fluorinating agent, i.e., it must be covered with such an amount of calcium chloride as to slow down the fluorination reaction of the organic chloro-derivatives.

Reaction is performed by subjecting the partially exhausted fluorinating agent to washing with water so as to remove a portion of the calcium chloride while simultaneously adding fresh calcium fluoride or a mineral containing it, such as fluorite, so that in the final suspension the calcium chloride is from between 1 and 20% by weight compared to calcium fluoride. The suspension is then spray-dried and the spheroidal fluorinating agent thus obtained and containing $CaF_2$ is again admitted to the reaction.

The reactivation process lends itself quite readily to being carried out continuously. An example of an embodiment of the continuously operating process is represented by the operational block scheme of drawing 1.

The partially exhausted fluorinating agent continuously leaving the reactor, 1, is fed into a standard mixer settler apparatus, 2, wherein the calcium chloride dissolution occurs. Into the mixer-settler fresh calcium fluoride originating from 3 and water from 4 are simultaneously fed. Such conditions are maintained in the settler whereby the excess calcium chloride solution is continuously removed from the top, trough 5, while from the bottom of the settler the calcium fluoride suspension in calcium chloride aqueous solution is extracted under suitable conditions for conveying it directly to the spray-drying device, 6. From the bottom thereof the spheroidal fluorinating agent containing calcium fluoride is drawn off and fed again to the reactor.

Turning to the flow sheet, 7 represents the feed of organic reagents to the reactor, and 8 represents the outlet for the reaction products.

To illustrate further the present invention, and the advantages thereof, the following specific examples are given, it being understood that these are merely intended to be illustrative and not limitative.

*Example 1*

1.350 kg. of anhydrous calcium chloride were dissolved in 12 l. of distilled water. 15 kg. of calcium fluoride were added under stirring to the solution in order to obtain a suspension which was kept under constant stirring in order to avoid settling.

Said suspension, having a $CaCl_2$ concentration, with respect to $CaF_2$, of 9% and of $CaF_2$, with respect to the pulp, of 53%, was conveyed at a flow rate of 30 l./hr. to the spray-dryer with an atomizing device of the two fluid nozzle type.

The temperature of the hot gases entering the drying chamber of the apparatus was maintained between 280 and 300° C., whereas the gases leaving the chamber, were of a temperature between 110° and 150° C.

The compressed air used as an auxiliary fluid was maintained at a pressure of 0.8 atmospheres.

The fluorinating agent containing calcium fluoride thus obtained is substantially anhydrous and occurs in the form of spheroidal particles having the following granulometric distribution:

| Percent | Mesh (Tyler scale) |
| --- | --- |
| 7.6 | 35–80 |
| 16.0 | 80–150 |
| 21.0 | 150–200 |
| 19.0 | 200–270 |
| 19.0 | 270–325 |
| 4.4 | 325–400 |
| 13.0 | beyond 400 |

The product obtained displays the following characteristics:

Surface area=9 m.$^2$/gr.

Volume of pores=0.280 cc./gr.

Operating as in Example 1, further examples of the process were carried out according to this invention relative to the preparation of the fluorinating agent containing $CaF_2$ by adding $CaCl_2$ or hydrochloric acid in an aqueous solution to commercial floated fluorite or $CaF_2$.

*Example 2*

1.5 kg. of anhydrous calcium chloride were dissolved in 15 l. of water. To the solution, 20 kg. of commercial, floated and ground "acid grade" fluorite were added under stirring.

The obtained suspension having a $CaCl_2$ concentration, with respect to $CaF_2$, of 7.5% and of $CaF_2$, with respect to the pulp, of 55%, was conveyed at a flow rate of 20 l./hr. to the same spray-drying device cited in Example 1. Pressure of the air employed as auxiliary fluid was maintained at 0.6 atm.

The temperature of the hot gases at the inlet was maintained between 230–250° C.; the temperature of the gases at the outlet from between 100–130° C.

The product thus obtained is substantially anhydrous and occurs in the form of spheroidal particles, hollow inside, displaying the following granulometric distribution:

| Percent | Mesh (Tyler scale) |
|---|---|
| 8 | 35–80 |
| 21 | 80–150 |
| 20 | 150–200 |
| 18 | 200–270 |
| 16 | 270–325 |
| 6 | 325–400 |
| 11 | beyond 400 |

*Example 3*

600 grams of anhydrous calcium chloride were dissolved in 3500 cc. of water. To the solution 3000 grams of calcium fluoride were added under stirring. The suspension thus obtained having a $CaCl_2$ concentration, with respect to $CaF_2$, of 20%, was conveyed at a flow rate of 16 l./hr. to a spray-dryer with an atomizing device of the speed rotating disc type.

The temperature of the gases at the inlet was maintained between 300–350° C.; the temperature of the gases at the outlet from between 95–120° C.

The product thus obtained is substantially anhydrous and occurs in the form of spheroidal particles, hollow inside, showing the following granulometric distribution:

| Percent | Mesh (Tyler scale) |
|---|---|
| 2 | 42–100 |
| 15 | 100–170 |
| 30 | 170–250 |
| 32 | 250–325 |
| 21 | under 325 |

*Example 4*

500 grams of 35% hydrochloric acid were dissolved in 3 l. of water.

To the solution was added under stirring 3500 grams of commercial fluorite having a particle size less than 325 mesh, and the following composition:

| | Percent |
|---|---|
| $CaF_2$ | 97.1 |
| $SiO_2$ | 1.1 |
| $CaCO_3$ | 1.0 |
| $Al_2O_3$ | 0.2 |
| Pb | 0.05 |
| Fe | 0.05 |
| Zn | 0.10 |
| S | 0.03 |

The suspension thus obtained containing 50% of fluorite was conveyed at a flow rate of 15 l./hr. to the same spray-drying device cited in Example 1.

Pressure of the air employed as an auxiliary fluid was maintained at 0.3 atm.

The temperature of the gases at the inlet was maintained between 280–300° C., the temperature of the gases at the outlet from between 100–150° C.

The product thus obtained is substantially anhydrous and occurs in the form of spheroidal particles, hollow inside, having the following granulometric distribution:

| Percent | Mesh (Tyler scale) |
|---|---|
| 1.5 | beyond 42 |
| 33 | 42–100 |
| 40 | 100–170 |
| 25 | 170–325 |
| 0.5 | under 325 |

Said product shows the following characteristics:

| | |
|---|---|
| Surface area _____m.²/g__ | 1 |
| Volume of pores _____cc./g__ | 0.190 |
| Bulk density _____g./cc__ | 1.18 |

Composition:

| | Percent |
|---|---|
| $CaF_2$ | 96.7 |
| CaCl | 1.3 |
| $SiO_2$ | 1 |
| $Al_2O_3$ | 0.3 |
| $Fe_2O_3$ | 0.2 |

*Example 5*

500 grams of 35% hydrochloric acid were dissolved in 900 cc. of water. To the solution 560 grams of commercial fluorite, having a particle size less than 325 mesh and the same composition as in Example 4, was added under stirring.

The suspension thus obtained, containing 80% of fluorite, was conveyed at a flow rate of 15 l./h. to the same spray-drying device cited in Example 1.

Pressure of the air employed as an auxiliary fluid was maintained at 0.3 atm.

The temperature of the gases at the inlet was maintained between 250–280° C.; the temperature of the gases at the outlet from between 110–160° C.

The product thus obtained is substantially anhydrous and occurs in the form of spheroidal particles, hollow inside, having the following granulometric distribution:

| Percent | Mesh (Tyler scale) |
|---|---|
| 9.8 | beyond 42 |
| 61.6 | 42—100 |
| 28 | 100—170 |
| 0.6 | 170—325 |

*Example 6*

500 grams of 35% hydrochloric acid were dissolved in 4400 cc. of water.

To the solution 2100 grams of commercial fluorite having a particle size less than 325 mesh and the same composition as in Example 4, were added under stirring.

The suspension thus obtained, containing 30% of fluorite, was conveyed at a flow-rate of 15 l./h. to the same spray-drying device cited in Example 1.

Pressure of the air employed as an auxiliary fluid was maintained at 0.3 atm. between 320–350° C.; the temperature of the gases at the outlet from between 120–180° C.

The product thus obtained is substantially anhydrous and occurs in the form of spheroidal particles, hollow inside, showing the following granulometric distribution:

| Percent | Mesh (Tyler scale) |
|---|---|
| 16.6 | 42–100 |
| 81.6 | 100–170 |
| 2.2 | 170–325 |

*Example 7*

630 grams of a spheroidal fluorinating agent, prepared as set forth in Example 1, was introduced in a nickel reactor suited for working according to the fluid bed technique. Carbon tetrachloride vapors were allowed to flow at a linear flow rate of 6 cm./sec. through the so arranged fluorinating agent, while keeping the reactor at 500° C. The contact time proved to be 4.7 seconds. The temperature along the whole axis of the reactor was quite homogeneous; the fluidization of the fluorinating agent was very good.

The test was continued for 64 minutes and the overall feed of carbon tetrachloride was 1150 grams.

The vapors leaving the reactor were cooled and washed with aqueous alkaline solutions. They displayed the following composition:

| | Moles (Percent) |
|---|---|
| CO | 0.1 |
| $CF_3Cl$ | 0.2 |
| $CF_2Cl_2$ | 13.9 |
| $CFCl_3$ | 31.6 |
| $CHCl_3$ | 0.1 |
| $CCl_4$ | 53.2 |

High boiling components—0.9 mole percent.

Table 1 records the reaction conditions and the results relative to Examples 8–11 which were carried out in order to show the application of the fluorinating agent, containing $CaF_2$, and prepared according to the examples from 1 to 6, as a reagent particularly suited in the fluorination reaction conducted in a fluid bed according to the present invention. Example 9 is a comparative example.

*Example 8*

550 grams of a spheroidal fluorinating agent prepared as set forth in Example 1, were introduced in a glass reactor. Through the fluorinating agent thus arranged 6.96 moles of vaporized carbon tetrachloride were allowed to flow. Temperature along the whole axis of the reactor was quite homogenous; the fluidization of the bed of the fluorinating agent was very good.

Vapors leaving the reactor were cooled and washed with aqueous alkaline solutions.

Results and reaction conditions are listed in Table 1.

*Example 9*

510 grams of commercial floated and grounded "Acid Grade" fluorite of the same size as the one employed for the preparation set forth in Example 2 were mixed with 160 grams coal (Lurgi KT4) with a particle size of between 42 and 325 mesh, and introduced into a nickel reactor.

Fluidization is not as good as in the preceding examples, however, it suffices to afford a rather homogeneous distribution of the temperature along the axis of the reactor.

Vapors leaving the reactor were cooled and washed with aqueous alkaline solutions.

Results and reaction conditions are listed in Table 1.

*Example 10*

590 grams of a spheroidal fluorination agent prepared from commercial fluorite as described in Example 2 were introduced into a nickel reactor.

8.11 moles of vaporized carbon tetrachloride were allowed to flow through the fluorinating agent thus arranged.

Temperature along the whole axis of the reactor was quite homogeneous; fluidization of the fluorinating agent bed was perfect.

Vapors leaving the reactor were cooled and washed with aqueous alkaline solutions.

Results and reaction conditions are listed in Table 1.

*Example 11*

770 grams of spheroidal fluorinating agent prepared as set forth in Example 4 were introduced in an Inconel reactor.

A mixture consisting of 98% $CCl_4$ and 2% $Cl_2$ was allowed to flow through the fluorinating agent thus arranged.

Temperature along the whole axis of the reactor was quite homogenous and the fluidization perfect. Vapors leaving the reaction were cooled and washed with diluted alkaline solutions.

The test was carried out for 90 minutes; the test was then continued with ever decreasing yields until a 53% conversion of $CaF_2$ was obtained; fluidization remained efficient throughout the test. Results and reaction conditions are listed in Table 1.

*Example 12*

In this example the catalytic action of disproportionation is depicted, which in some cases is displayed by the fluorinating agents employed according to the present invention.

By said action the fluorinating action is indirectly promoted, since a portion of the fluorination product is removed from the reaction equilibrium.

Moreover, the formation of $CF_2Cl_2$ during the $CCl_4$ fluorination is explained, even when said reaction is not carried out under strict operating conditions.

The reaction is carried out in an Inconel reactor of 150 cc. capacity. Feeding charge is made up of $CCl_3F$. The obtained product is made up in practice of unreacted $CCl_3F$ and $CCl_2F_2$.

Two tests sets have been carried out, the results and operative conditions of which are reported in Tables 2 and 3, and in the enclosed diagram.

The catalyst employed for the first test set is made up of pure $CaF_2$ obtained by precipitation and having the following characteristics: particle size lower than 325 mesh; surface area: 8 m.²/g. under powder form.

The catalyst employed for the second test set is made up of a fluorinating agent obtained by spraying from $CaF_2$ like the one set forth the first test set, treated with 6% anhydrous $CaCl_2$ and having a surface area of 9 m.²/g.

TABLE 2.—CATALYST: PURE $CaF_2$ OBTAINED BY PRECIPITATION

| | | | |
|---|---|---|---|
| Reaction temperature, °C | 310 | 410 | 475 |
| Contact time, sec | 3 | 3 | 3 |
| $CCl_3F$ conversion, percent | 2.5 | 7 | 8 |

TABLE 3.—CATALYST: FLUORINATING AGENT OBTAINED BY SPRAYING FROM $CaF_2$

| | | | | | |
|---|---|---|---|---|---|
| Reaction temperature, °C | 255 | 310 | 355 | 425 | 475 |
| Contact time, sec | 3 | 3 | 3 | 3 | 3 |
| $CCl_3F$ conversion, percent | 4 | 11 | 20 | 45 | 50 |

We claim:
1. A process for the preparation of a spheroidal fluorinating agent consisting essentially of calcium fluoride and calcium chloride, the calcium chloride being present therein in an amount of from between 1 and 20 percent by weight of the calcium fluoride, and particularly suited for fluorination reactions conducted in fluid bed, comprising suspending calcium fluoride in an aqueous solution of calcium chloride and subjecting the resultant suspension to simultaneous granulation and drying, said simultaneous granulation and drying being carried out at a temperature of from 100° to 500° C.

2. A process according to claim 1, wherein the calcium fluoride suspension is effected by suspending a calcium fluoride containing mineral in the aqueous solution of calcium chloride.

3. A process according to claim 2, wherein the calcium fluoride containing mineral is fluorite.

4. A process according to claim 1, wherein the resultant suspension comprises from between 30 to 80 percent by weight calcium fluoride and from between 1 to 20 percent by weight calcium chloride.

5. A process according to claim 2, wherein the resultant suspension comprises from between 30 to 80 percent by weight calcium fluoride and from between 1 to 20 percent by weight calcium chloride.

6. A process according to claim 4, wherein the simul-

TABLE 1

| Example No. | Temperature, °C | Contact times, seconds | Linear flow rate, cm./sec. | Composition of the vapors leaving the reactor, moles percent | | | | | | |
|---|---|---|---|---|---|---|---|---|---|---|
| | | | | CO | $CF_3Cl$ | $CF_2Cl_2$ | $CFCl_3$ | $CHCl_3$ | $CCl_4$ | High boiling |
| 8 | 470 | 3.2 | 8 | 0.1 | 0.1 | 15.4 | 32.7 | 0.1 | 50.1 | 1.5 |
| 9 | 500 | 4.2 | 6 | 1 | 0.1 | 1 | 7.2 | 0.1 | 90 | 0.5 |
| 10 | 470 | 2.4 | 6 | 1 | 0.9 | 0.3 | 15.8 | | 81.2 | 0.8 |
| 11 | 470 | 5 | 7 | 0.1 | Absent | 0.8 | 22 | | 73.2 | 0.9 | taneous granulation and drying is effected by spray-drying.

7. A process according to claim 5, wherein the simultaneous granulation and drying is effected by spray-drying.

8. A process according to claim 6, wherein the spray-drying is carried out at a temperature of from 200° C. to 350° C.

9. A process according to claim 7, wherein the spray-drying is carried out at a temperature of from 200° C. to 350° C.

10. A process for the preparation of a spheroidal fluorinating agent consisting essentially of calcium fluoride and calcium chloride, the calcium chloride being present therein in an amount of from between 1 and 20 percent by weight of the calcium fluoride, and particularly suited for fluorination reactions conducted in fluid bed, comprising suspending fluorite in an aqueous hydrochloric acid solution and subjecting the resultant suspension to simultaneous granulation and drying, said simultaneous granulation and drying being carried out at a temperature of from 100° to 500° C.

11. A spheroidal, substantially anhydrous fluorinating agent consisting essentially of calcium fluoride and calcium chloride, the calcium chloride being present in an amount of from between 1 and 20 percent by weight of the calcium fluoride.

12. A fluorinating agent according to claim 11 having a granulometric distribution of from between about 35 mesh and about 400 mesh.

13. A process for the regeneration of the spheroidal, substantially anhydrous fluorinating agent of claim 11 upon its surface contamination with a coating of calcium chloride, comprising washing the same with water, simultaneously adding fresh calcium fluoride thereto in such amount as to effect a suspension containing calcium chloride in an amount from between 1 and 20 percent by weight of the calcium fluoride and subjecting the resultant suspension to simultaneous granulation and drying, said simultaneous granulation and drying being carried out at a temperature of from 100° C. to 500° C.

14. A process according to claim 13, wherein the fresh calcium fluoride is added in the form of a calcium fluoride containing mineral.

15. A process according to claim 13, wherein the simultaneous granulation and drying is effected by spray-drying.

16. A process according to claim 14, wherein the simultaneous granulation and drying is effected by spray-drying.

References Cited

FOREIGN PATENTS 941,144  11/1963  Great Britain.

LEON D. ROSDOL, *Primary Examiner.*

S. D. SCHWARTZ, *Assistant Examiner.*